(No Model.)

W. C. BARCLAY.
PIPE JOINT.

No. 365,425. Patented June 28, 1887.

Witnesses

Inventor
Wm. C. Barclay
by his Attorneys

UNITED STATES PATENT OFFICE.

WILLIAM C. BARCLAY, OF WELLSBURG, WEST VIRGINIA, ASSIGNOR TO LEMUEL BANNISTER, OF CHICAGO, ILLINOIS.

PIPE-JOINT.

SPECIFICATION forming part of Letters Patent No. 365,425, dated June 28, 1887.

Application filed March 18, 1886. Serial No. 195,726. (No model.)

*To all whom it may concern:*

Be it known that I, WILLIAM C. BARCLAY, of Wellsburg, West Virginia, have invented an Improved Pipe-Joint, of which the following is a specification.

My invention is more especially intended for pipe systems for conducting natural gas, which is distributed at quite a high pressure compared with the ordinary illuminating-gas. There is, therefore, an increased leakage at the joints of the pipes, which often causes serious accidents. The joint may, however, be used in any system of piping.

Figure 1:
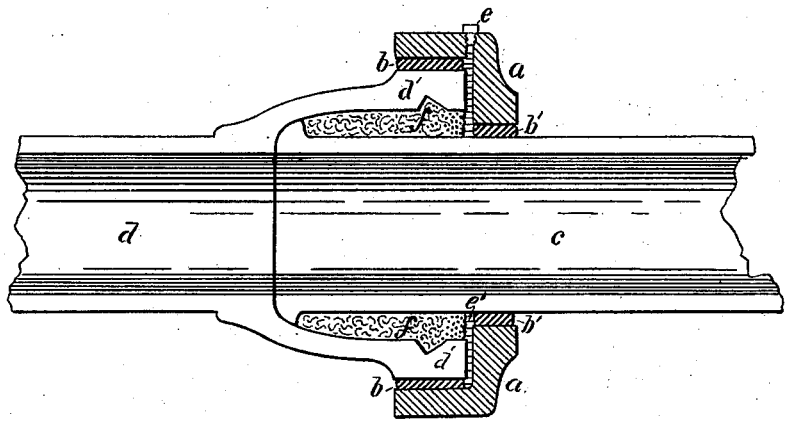
Figure 2:
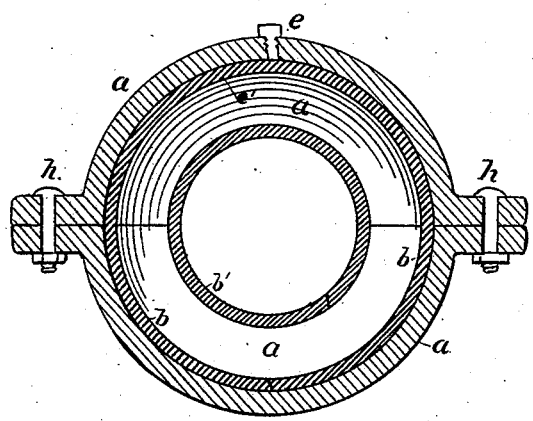
Figure 3:
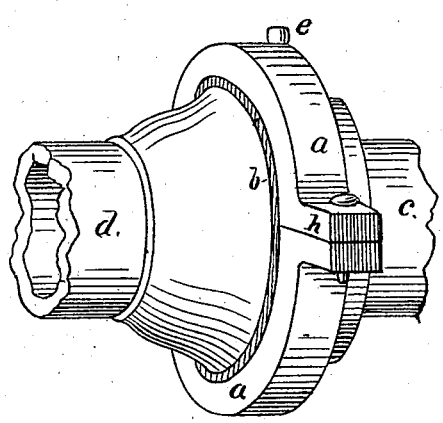

In the accompanying drawings, Figure 1 is a longitudinal section through a pipe-joint arranged according to my invention. Fig. 2 is a transverse section therethrough, and Fig. 3 a perspective view.

$c$ represents the ordinary spigot end of one pipe, and $d$ the bell-mouth end of an adjoining pipe into which it projects. The spigot end of one pipe is formed with an annular enlargement, as usual, and the inner face of the bell of the other pipe is formed with an annular depression or groove, $d'$. The space between the spigot end of one pipe and the bell-mouth end of the other is packed or calked with lead, $f$, or other suitable material, as usual.

I employ a band or clamp, $a$, which is preferably formed in halves having flanges, which are bolted together around the joint of the pipe by bolts $h$. This clamp is provided with two clamping-surfaces, one of which surrounds the spigot end of one pipe and the other the bell-mouth end of the next pipe.

Between the clamp and the pipe, at or near the bell-mouth end of one pipe, I interpose a rubber or other packing ring or gasket, $b$—preferably elastic—and a similar ring, $b'$, between the clamp and the pipe near the spigot end of pipe $c$. When the clamp is applied in place, therefore, and bolted up tightly, a very secure and durable joint will be formed. There will, however, in practice be more or less of a space between the end of the pipe-bell and the packing $f$ therein on the one side and the clamp $a$ and the gasket $b'$ on the other side. In order, therefore, to completely seal the joint, I fill this space with melted tar or other good packing substance, $e'$, which can be introduced in a fluid state.

At $e$ an aperture is bored in the clamp for the introduction of this material, and when all the space within the clamp has been completely filled the aperture is closed by a screw or plug, as clearly shown.

The packing-rings $b$ $b'$ are shown as interposed between the clamp and pipe-sections, so as to prevent contact, and the construction therefore permits of the use of elastic packing-rings, which may be screwed up more or less tightly. The pressure of the clamp upon the bell-mouth of the pipe tends to draw the pipe into closer contact with the packing $f$ within the bell-mouth.

I am aware that heretofore it has been proposed to incase a pipe-joint in a jacket, to calk or pack the joint between each pipe-section and the jacket, and to fill the jacket through an aperture therein with some liquid for further sealing or packing the joint, as shown, for instance, in patent of McCormick, No. 329,405.

I claim as my invention—

1. The combination of the pipe sections, the packing or calking $f$, the clamp, and the packing-rings $b$ $b'$, which are compressed by the clamp against the pipe sections.

2. The combination of the pipe-sections, the clamp formed with an aperture therein, the packing-rings $b$ $b'$, which are compressed by the clamp against the pipe-sections, and the packing material $e'$.

3. The combination of the spigot end of one pipe-section, formed with an annular enlargement on its end, the bell-shaped end of an adjoining pipe section, formed with an annular depression or groove in the inner face of the bell, the packing or calking in the space between the bell and spigot ends of the pipe-sections, the clamp $a$, and the packing-rings $b$ $b'$.

4. The combination of the two pipe sections, the spigot end of one fitting within the bell-mouth of the other, packing within the bell-mouth interposed between the pipe-sections, a clamp which embraces the bell-mouth of one pipe-section and the spigot end of the other, and packing interposed between the clamp and each pipe-section, the packing between the bell-mouth and clamp and the packing within the bell-mouth being in the same line of compression, substantially as set forth.

In testimony whereof I have hereunto subscribed my name.

WILLIAM C. BARCLAY.

Witnesses:
J. M. WALKER,
J. W. BURNS.